United States Patent [19]

Lucas

[11] Patent Number: 4,778,728
[45] Date of Patent: Oct. 18, 1988

[54] CURABLE COMPOSITIONS AND CORROSION RESISTANT COATINGS PREPARED THEREFROM

[75] Inventor: Howard R. Lucas, Danbury, Conn.

[73] Assignee: American Cyanamid Company, Stamford, Conn.

[21] Appl. No.: 106,749

[22] Filed: Oct. 8, 1987

[51] Int. Cl.⁴ .................. C08K 5/46; C08K 5/34; B32B 15/08; C23F 9/00
[52] U.S. Cl. .................. 428/461; 252/388; 252/390; 252/391; 252/392; 524/83; 524/87; 524/91; 524/104; 524/106; 525/381
[58] Field of Search .............. 524/83, 87, 91, 104, 524/106; 525/381; 428/461; 252/388, 390, 391, 392

[56] References Cited

U.S. PATENT DOCUMENTS

| | | | |
|---|---|---|---|
| 4,000,349 | 12/1976 | Dickie et al. | 428/461 |
| 4,184,991 | 1/1980 | Schevrman | 524/91 |
| 4,385,097 | 5/1983 | Isozaki et al. | 428/461 |
| 4,446,280 | 5/1984 | Cady et al. | 525/186 |
| 4,487,878 | 12/1984 | Vasta | 525/381 |
| 4,490,501 | 12/1984 | Vasta | 525/381 |
| 4,495,248 | 1/1985 | Vasta | 525/381 |
| 4,506,054 | 3/1985 | Vasta | 525/381 |
| 4,517,378 | 5/1985 | Vasta | 525/381 |
| 4,521,563 | 6/1985 | Lucas | 524/555 |
| 4,522,973 | 6/1985 | Ley et al. | 525/381 |
| 4,528,320 | 7/1985 | Ley et al. | 524/555 |
| 4,530,960 | 7/1985 | Ley et al. | 524/555 |
| 4,612,236 | 9/1986 | Hsu et al. | 428/463 |
| 4,656,308 | 4/1987 | Schirmann et al. | 526/304 |

FOREIGN PATENT DOCUMENTS 138025   4/1985   European Pat. Off. .

*Primary Examiner*—Herbert J. Lilling
*Attorney, Agent, or Firm*—Roger S. Benjamin

[57] ABSTRACT

Compositions comprising an amine-reactive vinyl polymer and a polyfunctional amine crosslinker when combined with a benzotriazole or a polypyridyl, alone, or in further combination with 2-hydroxypyridine cure into coatings having superior corrosion resistance.

20 Claims, No Drawings

CURABLE COMPOSITIONS AND CORROSION RESISTANT COATINGS PREPARED THEREFROM

This invention relates to low temperature curing thermoset resins. More particularly, this invention relates to compositions comprising an amine-reactive polymer and crosslinking agent, which also include triazole and/or pyridine compound, which produce crosslinked coatings having superior corrosion resistance.

BACKGROUND OF THE INVENTION

Low temperature cure coating compositions based on amine-reactive polymers are illustrated in Cady et al., U.S. Pat. No. 4,446,280, in European Patent Office (EPO) Application No. 0138025, dated Apr. 24, 1985, and EPO Application No. 0020000, dated Dec. 10, 1980. These coating compositions are based upon solvent borne, solution polymers containing activated ester groups. In U.S. Pat. No. 4,446,280, the polymer thereof is crosslinked by the use of an amine-terminated triazine resin, to give a film with good resistance properties. In EPO Application No. 0138025, a superior crosslinker is described, and this is, preferably, a triamine made by condensing a maleate ester and an alkylene diamine.

The use of such a crosslinker makes possible good low temperature cure, while yielding a hard yet flexible films having good resistance properties, and provides efficient utilization of the amine-reactive groups of the crosslinkable polymer. Hence, the provision of such a crosslinking agent and of compositions based thereon useful, for example, for coatings and adhesive applications, has constituted a significant advance in the art.

However, such compositions and coatings do have one drawback and that is a slight deficiency in their resistance to corrosive environments, as demonstrated for example, on exposure to sprays of hot salt solutions. It would be desirable to provide such compositions with corrosion resistance approaching that of epoxy resins and such has now been accomplished. The combinations of this invention employing benzotriazole or a polypyridyl, alone, or in further combination with 2-hydroxypyridine vastly improve the corrosion resistance of the state of the art systems.

SUMMARY OF THE INVENTION

It is accordingly one object of the present invention to provide a composition that makes possible low temperature cure, that yields a hard yet flexible film having good corrosion resistance properties.

A further object is to provide a composition based on amine-reactive groups of a crosslinkable polymer and a crosslinking agent, which cures to a corrosion-resistant coating.

A still further object is to provide a crosslinked coating obtained by curing this composition, the coating having increased corrosion resistance.

An even further object is to provide a metallic substrate with a corrosion-resistant protective coating.

Additional objects, advantages and novel features of the invention will be set forth in the description which follows, and in part will become apparent to those skilled in the art upon examination of the following or may be learned by practice of the invention.

According to the present invention, there are provided curable compositions adapted to produce corrosion resistant coatings, said compositions comprising:
 (a) an amine-reactive vinyl polymer;
 (b) a crosslinking agent containing at least two primary or secondary amine groups per molecule, the crosslinking agent being present in an amount sufficient to form a crosslinked polymer, and an effective corrosion preventing amount of:
 (c) (i) a benzotriazole or a dipyridyl, alone, or in further combination with
 (ii) 2-hydroxypyridine.

In another aspect, the present invention contemplates crosslinked corrosion resistant coatings obtained by curing compositions as above defined.

In still another feature, the invention provides articles of manufacture comprising a metallic substrate normally adversely affected by corrosive environments and on the substrate a crosslinked corrosion resistant coating layer obtained by curing a composition as above defined.

The compositions of this invention are useful in automotive, appliance and many other areas where fabricated metal parts, e.g., steel parts, are subject to environments corrosive to the metal substrates.

DETAILED DESCRIPTION OF THE INVENTION

The amine-reactive vinyl polymers used as component (a) are known in the art and can be made by reported procedures. Preferably, the amine-reactive polymer contains repeating units derived from an activated ester-containing vinyl monomer of the formula:

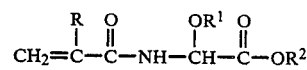

in which the R group is H or Me, the $R^1$ group is hydrogen, alkyl of 1-6 carbon atoms, cycloalkyl of 5-6 carbon atoms, or 2-hydroxyalkyl of 2-6 carbon atoms, and the $R^2$ group is selected from alkyl of 1-6 carbon atoms, cycloalkyl of 5-6 carbon atoms, and 2-hydroxyalkyl of 2-6 carbon atoms. Suitable vinyl monomers include methyl acrylamidoglycolate methyl ether (MAGME), butyl acrylamidoglycolate butyl ether, ethyl acrylamidoglycolate ethyl ether, butyl acrylamidoglycolate ethyl ether, methyl acrylamidoglycolate ethyl ether and ethyl acrylamidglycolate methyl ether, with MAGME being preferred.

These vinyl monomers are suitably formed by the procedures set forth in EPO Application No. 0138025, which is discussed earlier. Additionally, attention is invited to a number of illustrative procedures set forth later in this description of the present invention.

The activated ester group-containing polymer may contain repeating units derived from one or more copolymerizable ethylenically unsaturated monomers. Useful comonomers include, but are not limited to, $C_1$–$C_{18'}$ preferably $C_1$–$C_8$, alkyl esters of acrylic acid, $C_1$–$C_{18'}$ preferably $C_1$–$C_8$, alkyl esters of methacrylic acid, hydroxycontaining monomers such as hydroxyethyl acrylate, hydroxypropyl acrylate, hydroxyethyl methacrylate and hydroxypropyl methacrylate, styrene, alpha-methyl styrene, acrylonitrile, acrylamide, acrylic acid, methacrylic acid, vinyl acetate, t-butylaminoethyl methacrylate, and the like.

The polymer containing activated ester groups may be polymerized, or more preferably copolymerized with these other monomers, according to conventional polymerization techniques. No special precautions are required. However, for viscosity control in solution polymers, a hydrogen bonding solvent should be included in the polymerization solvent mixture. Procedures for forming solvent borne, solution polymers are set forth in U.S. Pat. No. 4,446,280, which is discussed earlier. Attention is also invited to the illustrative polymerization procedures set forth below in the description of the present invention.

The polymers so produced may be cured by reaction with compounds (such as component (b) of the present invention) containing at least two primary or secondary amine groups per molecule at temperatures from as low as room temperature to 200° C. in a period of less than about 30 minutes, though longer times may be needed at the lower temperatures. The amine functional crosslinking agents used as component (b) are known in the art, e.g., from the above-mentioned EPO Applications Nos. 0020000 and 0138025, as well as U.S. Pat. No. 4,446,280. Special mention is made of a sterically unhindered, trifunctional primary amine of the formula:

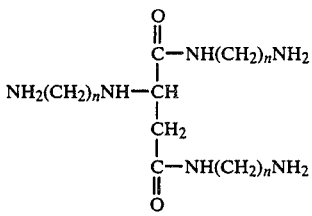

in which n=4–8. The preferred trifunctional primary amine is N,N'-bis(6-aminohexyl)-2-[(6-aminohexyl)amino] butanediamide, in which n in the above formula is 6.

The primary or secondary amine groups must be available for entering into the curing reaction with the activated ester of the monomer. Generally, this means that they are pendantly attached to a compound. For purposes of this invention, pendant amine groups include terminal amine groups, as well as those attached to the compound or to a side chain thereon.

Suitable compounds containing amine groups useful herein include such as:
1,2-ethylenediamine
1,3-propylenediamine
1,2-butylenediamine
1,4-butylenediamine
1,6-hexamethylenediamine
1,7-heptanediamine
diethylenetriamine
xylyldiamine
4,7-dioxadecan-1,10-diamine
1,2-diaminocyclohexane
Bis(p-aminocyclohexyl)methane
2,2-Bis(4-aminocyclohexyl)propane
N,N-Bis(3-aminopropyl)methylamine
Bis(hexamethylenetriamine)

Alternatively, the amine containing compound may be a polymer which contains at least about 1% by weight of pendant amine groups.

Representative polymers containing pendant amine groups can be derived from epoxy and epoxy-modified diglycidyl ethers of bisphenol A structures, various aliphatic polyethylene or polypropylene glycol (diglycidyl ether) adducts, and glycidyl ethers of phenolic resins, such epoxy resins being commercially available and commonly used in the electrocoating field.

Other useful polymers containing pendant amine groups include polyamide resins, for example, condensation products of dimerized fatty acids coreacted with difunctional amine, such as ethylene diamine. Polyamide resins generally are those having a molecular weight between about 500 and 5,000. Further useful polymers containing pendant amine groups include acrylic resins having molecular weight of about 1,000 to about 1,000,000 or more, polyester resins and polyurethane resins both having a molecular weight range of about 500 to about 5,000, and vinyl resins.

Also, there are amine-terminated triazine resins which are condensation products of the reaction between 2,4,6-triamino-1,3,5-triazine,2(H,C, to $C_{18}$ aliphatic or cycloaliphatic, or phenyl) 4,6-diamino-1,3,5-triazine or their corresponding chlorides with a diamine or polyamine chosen from $C_2$ to $C_{14}$ aliphatic diamines and polyamines, $C_5$ to $C_{15}$ cycloaliphatic diamines, $C_6$ to $C_{15}$ aromatic diamines, and optionally a monofunctional amine chosen from $C_2$ to $C_6$ hydroxyalkylamine, $C_1$ to $C_{18}$ aliphatic amine, $C_4$ to $C_{18}$ ether amines, $C_5$ to $C_6$ cycloaliphatic amines, and $C_6$ to $C_{11}$ aromatic amines. The resulting product has an average amine functionality of at least two and preferably 3 to 5. The preferred amine functionality is derived from primary aliphatic amines. On the average, the condensation product will contain 1 to 10 triazine moieties, and preferably 2 to 6 triazine moieties.

Typical, but not exclusive, diamines and polyamines are:
1,6-hexanediamine
1,12-dodecanediamine
1,2-ethylenediamine
4,7-dioxodecane-1,10-diamine diamino toluene
3, or 4-(aminomethyl)benzylamine
4,4'diaminodiphenyl methane
phenylenediamine
2,4-bis(p-aminobenzyl)aniline
bis(4,4'-aminocyclohexyl)methane
1,3 and 1,4 bis(aminomethyl)cyclohexane
diamino cyclohexane
diethylenetriamine
triethylene tetramine
bis hexamethylenetriamine
Typical examples for monoamines are:
ethanolamine
diethanolamine
1-amino-2-propanol
3-amino-propanol
$C_1$ to $C_{18}$ alkylamines
$C_4$ to $C_{18}$ etheramines
The ether amines have the general structure $R^3$—O—$(CH_2)_3$—$NH_2$ where R is $C_1$ to $C_{15}$ alkyl.

The amine terminated triazine resins are obtained by either melt condensation of the aminotriazine compound with the amine in the presence of an acid catalyst at temperatures of 120° to 250° C. or by reaction of the chloride (such as cyanauric chloride) with the amine in the presence of an acid scavenger. Examples are given in U.S. Pat. No. 2,393,755 and in E. M. Smolin and L. Rapport, "s-Triazine and Derivatives" in "The Chemistry of Heterocyclic compounds, a series of Monographs", A. Weissberger, Editor, Interscience Publishers, Inc., New York, 1959.

The triazine resin has to have at least two primrry or secondary amine functional sites to crosslink the activated ester moiety. The preferred compound has at least two primary or secondary amine groups per molecule. The primary amine functional sites are preferred over the secondary.

The amine groups of the amine-terminated triazine resin in the formulation may range from about 0.5 to 10 equivalents of the activated carboxylic ester functionality in a given polymer. The preferred range is 0.8 to 1.2 equivalents.

A preferred species of the amine-terminated triazine resin of the present invention has the formula

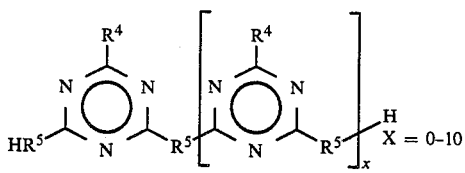

wherein $R^4$ $^4$ is selected from hydrogen, $NH_2$, $R^5H$, aromatic, aliphatic of 1–18 carbon atoms, cycloaliphatic of 5–6 carbon atoms, and hydroxyalkylamine, $R^5$ is a bridging unit derived from primary diamines selected from aliphatic of 2–14 carbon atoms, cycloaliphatic of 5–15 carbon atoms, aromatic of 5–15 carbon atoms and $-NH(CH_2)_3O(CH_2)_y O(CH_2)_3NH-$, y is an integer of 2–12.

Another preferred species of amine-terminated triazine resin has the formula:

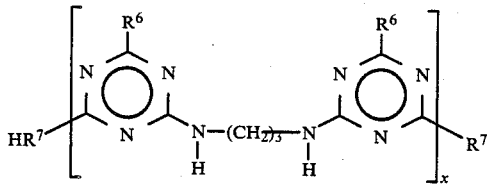

wherein $R^6$ is selected from $R^7$ and $NH_2$, and $R^7$ is $-NH(CH_2)_6NH_2$, x is an integer of 1–3 and the ratio of triazine to hexamethylenediamine is from about 2.5 to 2:5.

The crosslinking agent is synthesized by heating an unsaturated diester of the formula:

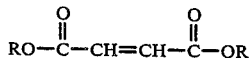

in which R is an alkyl of 1–4 carbon atoms, with a diamine of the formula:

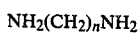

in which n=4–8, and collecting an alcohol such as methanol in the case where R is methyl, as the byproduct. The diester is an ester of either maleic or fumaric acid, with a convenient diester being dimethyl maleate. The preferred diamine is 1,6-hexanediamine.

The amount of heat applied to the reaction vessel is selected to give a pot temperature at which distillation of the alcohol byproduct occurs. The reactants are combined in a molar ratio of at least about 3:1 (diamine:diester). A molar ratio of about 3:1 is convenient. If a molar ratio of more than about 3:1 is used, typically the molar ratio will be only slightly more than 3:1, with about 5:1 being a practical upper limit because of difficulty in removing the unreacted excess of diamine. Conveniently, the reaction is a solventless reaction, i.e., no solvent is added to the reactants, the reactants are mixed with stirring during the course of the reaction, and the reaction is carried out under ambient atmosphere. The reaction is continued until no more alcohol byproduct is evolved. The desired product is recovered, for example, by pouring the reaction mixture into a large excess of toluene, and separating as the product, the material that is insoluble in toluene and more dense than toluene.

The amount of the trifunctional amine used in a composition containing a primary amine-reactive polymer, may vary widely and is generally determined by a number of factors such as the extent of crosslinking desired and the particular reactants employed. In any event, the crosslinker is used in a sufficient amount to form a crosslinked polymer. Generally, the functional groups of the amine crosslinker in the composition will range from about 0.5 to 10 equivalents based on the primary amine-reactive functionality of the polymer employed. The preferred range is about 0.8 to 1.2 equivalents of primary amine per equivalent of activated ester(amine reactive functionality).

When the composition is based upon an activated ester group-containing polymer, the polymer should contain from about 2–35 weight percent of repeating units derived from the activated ester-containing vinyl monomer. In the case of a solvent borne, solution polymer, optimum properties are obtained when about 20–35 weight percent of the repeating units are derived from this monomer.

The compound used as component (c)(i) can vary widely in type and amount. The compounds are made by known procedures, and many of them are commercially available. Illustrative compounds include: 2 alpha hydroxy benzyl benzimidazole, hydroxy benzotriazole, mercaptobenzimidazole, 7-hydroxy 1,2-naphthimidazole, 2-benzimidazolyl acetonitrile, 2-hydroxy benzimidazole, amino benzimidazole, 2-methyl benzimidazole, 3,5-dimethyl phenyl pyrizole, benzotriazol, 2-benzimidazolemethanol, 2-amino-3-methyl pyridine, 2-amino phenyl benzimidazole, imidazole, antipyrine, pyrrole, quinaldine, amino pyrimidine, guanidinobenzimidazole, azaadine, 3,5-diamino 1,2,4-triazole. Preferred are: benzotriazole, 2-benzimidazolemethanol, ethylene diamine, 3-amino, 1,2,4-triazole, 2,2-Dipyridyl, dipyridyl, 1,5-Pentamethylene tetrazole and tetramethylene pentamine.

Special mention is made of benzotriazole, 3-amino-1,2,4-triazole, 2,2-dipyridyl and 2,2-dipyridyl amine. The amounts of component (c)(i) generally range from about 1 to 5 percent by weight, based on the weight of resin, with optimum level for benzotriazole being about 3 percent by weight.

In those compositions containing component (c)(ii), the 2-hydroxypyridine is readily available and it can be used in varying amounts. In general, however, it will comprise from about 1 to about 5, and preferably 3, percent by weight of the resin weight, and normally is used in amounts equal to and preferably less than that of the component (c)(i), most preferably, (c)(ii) will comprise from about 25 to about 50 percent by weight of (c)(i).

The crosslinkable, amine-reactive composition used in the present invention, is cured by reaction with the tri-functional primary amine, at low temperature. By "low temperature" is meant from about ambient temperature up to and including about 50° C., and, in certain instances, up to and including about 100° C. When MAGME is used as the activated ester-containing vinyl monomer, crosslinking can occur at room temperature. When higher alkyl esters are used, such as the butyl ester, heating is required to obtain the crosslinked film.

The composition of the present invention is readily cured by exposure to an appropriate low temperature for an adequate period of time. The speed of curing depends upon factors including the particular temperature at which curing is carried out, the components forming the composition, and the presence or absence of an accelerator.

The composition may contain such other ingredients as are customarily employed in coating compositions. Such ingredients include pigments, and flow additives and modifiers. Compositions of the present invention based upon solvent borne, solution polymers bearing activated ester groups, are useful as general purpose coatings, as well as coatings in automotive, wood, decorative, textile and paper applications.

DESCRIPTION OF THE PREFERRED EMBODIMENTS

The following examples illustrate the compositions and articles of this invention. They are not to be construed to limit the claims in any manner.

All parts and percentages are by weight, unless otherwise specified.

The following abbreviations have the following meanings:
BA: butyl acrylate
MAGME: methyl ester, methyl ether of acrylamido glyoxylic acid
MMA: methyl methacrylate
STY: styrene
TBM: t-butylaminoethyl methacrylate
n-DDM: n-dodecanethiol
t-BPO: t-butyl peroctoate
HEMA: hydroxyethyl methacrylate The following procedure shows how to make a crosslinking agent for use in this invention.

PROCEDURE A

A reaction vessel containing dimethyl maleate (43.2 g, 0.3 moles) and hexamethylenediamine (175 g, 1.5 moles) is heated under ambient atmosphere with stirring, so as to remove by distillation, methanol as the byproduct. After 90 minutes, the pot temperature increases to 170° C., and the reaction is terminated since no more methanol byproduct is being evolved. The reaction mixture is poured into a large excess of toluene, and a product is separated that is insoluble in toluene and more dense than toluene. IR and NMR spectra are consistent with the desired N,N'-bis(6-aminohexyl)-2-((6-aminohexyl)amino) butanediamide structure. The product yield is 50.0 g. The product is insoluble in toluene, chlorobenzene and carbon tetrachloride, and soluble in methylene dichloride, cellosolve, methanol, chloroform and water.

The following procedures show how to make amine-reactive vinyl polymer backbones for use in this invention.

PROCEDURE B

To a 1 liter three neck flask, equipped with stirrer, thermometer, condenser, nitrogen sparge tube, monomer addition port and heating mantle is added 13.2 grams of ethanol and 20 grams of toluene. The contents of the flask are sparged with nitrogen for 20 to 30 min., then heated to reflux at about 82° C. At this point, a solution of the following is added slowly through the addition port by means of a positive displacement pump.

| Components | parts, grams |
| --- | --- |
| Ethanol | 119.6 |
| Toluene | 179.2 |
| Methyl ester, methyl ether of acrylamido glyoxylic acid (MAGME) | 66.4 |
| Butyl acrylate | 132.8 |
| Methyl methacrylate | 99.6 |
| Styrene | 33.2 |
| n-Dodecanethiol | 3.4 |
| t-Butyl peroctoate | 6.7 |

The addition requires 5½ hours during which time the reflux (82° C.) and nitrogen sparge are maintained. After addition of monomers, heating at reflux and nitrogen sparge are continued an additional 11½ hours. The resulting polymer solution is a light yellow color having a solids content of 53.7%.

PROCEDURE C

Procedure B is repeated, except that the solution to be added is as follows:

| Components | parts, grams |
| --- | --- |
| Ethanol | 119.6 |
| Toluene | 179.2 |
| MAGME | 66.4 |
| Butyl acrylate (BA) | 132.8 |
| Methylmethacrylate (MMA) | 91.2 |
| Styrene (STY) | 33.2 |
| t-Butylaminoethylmethacrylate (TBM) | 8.3 |
| n-Dodecanethiol (n-DDM) | 3.4 |
| t-Butylperoctoate (t-BPO) | 6.7 |

Polymer solids are 59.0%.

PROCEDURE D

Procedure B is repeated, except that the solution to be added is as follows:

| Components | parts, grams |
| --- | --- |
| Ethanol | 119.6 |
| Toluene | 179.2 |
| MAGME | 66.4 |
| BA | 124.4 |
| MMA | 91.2 |
| STY | 33.2 |
| TBM | 16.6 |
| n-DDM | 3.4 |
| t-BPO | 6.7 |

Polymer solids are 51.1%.

PROCEDURE E

Procedure B is repeated, except that the solution to be added is as follows:

| Components | parts, grams |
|---|---|
| Ethanol | 119.6 |
| Toluene | 179.2 |
| MAGME | 66.4 |
| BA | 107.8 |
| MMA | 91.2 |
| STY | 33.2 |
| TBM | 33.2 |
| n-DDM | 3.4 |
| t-BPO | 6.7 |

Polymer solids are 51.0%.

PROCEDURE F

Same as Procedure C, except that 2-vinylimidazole is used instead of tert-butylaminoethyl methacrylate.

PROCEDURE G

Same as Procedure C, except that acrylic acid is used instead of tert-butylaminoethyl methacrylate.

PROCEDURE H

Same as Procedure C, except that dimethylaminopropyl methacrylamide is used instead of tert-butylaminoethyl methacrylate.

PROCEDURE I

To a 1 liter three neck flask, equipped with stirrer, thermometer, condenser, nitrogen sparge tube, monomer addition port and heating mantle is added 13.6 grams of ethanol and 20.4 grams of toluene. The contents of the flask are sparged with nitrogen for 20 minutes then heated to reflux (about 82° C.). At this point, a solution of the following is added through the addition port by means of a positive displacement pump.

| Components | parts, grams |
|---|---|
| Ethanol | 122.4 |
| Toluene | 183.6 |
| MAGME | 68.0 |
| MMA | 119.0 |
| BA | 110.6 |
| TBM | 8.6 |
| Hydroxyethyl methacrylate (HEMA) | 34.0 |
| n-DDM | 3.0 |
| t-BPO | 6.8 |

The addition requires 5 hours, during which time the reflux (82° C.) and nitrogen sparge are maintained. After addition of monomers, heating at reflux and nitrogen sparge are continued an additional 10½ hours. Polymer solids are 51.2%.

PROCEDURE J

Procedure I is repeated, except that the following solution is added:

| Components | parts, grams |
|---|---|
| Ethanol | 122.4 |
| Toluene | 183.6 |
| MAGME | 68.0 |
| BA | 119.0 |
| MMA | 76.5 |
| STY | 68.0 |
| HEMA | 34.0 |
| TBM | 8.5 |
| n-DDM | 3.0 |
| t-BPO | 6.8 |

Final solids after polymerization was 53.8% solids.

EXAMPLE 1

A curable composition in accordance with this invention is prepared by intimately mixing 9.3 grams of the amine-reactive vinyl resin of Procedure B, 2.0 g of the trifunctional amine crosslinking agent of Procedure A, 0.18 g of benzotriazole and 0.1 g of 2-hydroxypyridine. A Bondrite 100 ™ panel is coated with a layer of the composition using a 3 ml Bird Bar. The coated panel is air dried for 20 to 30 minutes, then baked at 100° C. for 20 minutes. For comparative purposes the procedure is repeated, but the benzotriazole and 2-hydroxypyridine are omitted. The coated panels are evaluated in terms of the ability to protect steel against corrosion by exposure to salt spray under the conditions of ASTM-B117. The results obtained with the composition according to this invention are 0.06% corrosion after 792 hours, a significant degree of corrosion protection being demonstrated. Without the benzotriazole or the 2-hydroxypyridine, protection is significantly reduced, 3% corrosion being experienced after only 288 hours under the same conditions.

EXAMPLES 2–13

The general procedure of Example 1 is repeated, substituting the other amine-reactive vinyl polymers described above, and in some cases omitting the 2-hydroxypyridine. In two instances a white pigment is added. In three instances, benzotriazole was replaced by other hetrocyclic amines. In numerous cases, for comparison purposes, compositions omitting heterocylic amines were also prepared. The formulations employed, together with that of Example 1, are set forth in Table 1:

TABLE 1

Curable Compositions Comprising Amine-Reactive Vinyl Polymers and Trifunctional Amines

| Example | Resin Procedure (wt used) | TFA amine (wt used) | Benzo-triazole | 2-Hydroxy-pyridine | Pigment Type |
|---|---|---|---|---|---|
| 1A* | B (9.3 g) | 2.0 g | none | none | none |
| 1 | B (9.3 g) | 2.0 g | 0.18 g | 0.10 g | none |
| 2A* | C (8.5 g) | 2.0 g | none | none | none |
| 2 | C (8.5 g) | 2.0 g | 0.18 g | 0.10 g | none |
| 2B* | C (10.0 g) | 2.0 g | none | 0.10 g | none |
| 3A* | D (10.0 g) | 2.0 g | none | none | none |
| 3B* | D (10.0 g) | 2.0 g | none | 0.10 g | none |
| 3 | D (10.0 g) | 2.0 g | 0.18 g | 0.10 g | none |
| 4A* | E (10.0 g) | 2.0 g | none | none | none |
| 4B* | E (10.0 g) | 2.0 g | none | 0.10 g | none |
| 4 | E (10.0 g) | 2.0 g | 0.18 g | 0.10 g | none |
| 5A* | F (10.0 g) | 2.0 g | none | none | none |
| 5 | F (10.0 g) | 2.0 g | 0.18 g | none | none |
| 6A* | G (10.0 g) | 2.0 g | none | none | none |
| 6 | G (10.0 g) | 2.0 g | 0.18 g | none | none |
| 7A* | H (10.0 g) | 2.0 g | none | none | none |
| 7 | H (10.0 g) | 2.0 g | 0.18 g | none | none |
| 8 | I (20.0 g) | 4.1 g | 0.37 g | 0.12 g | none |
| 9 | I (20.0 g) | 2.70 g | 0.27 g | 0.09 g | R900 ®[a] |
| 10 | J (20.0 g) | 2.87 g | 0.27 g 3-amine 1,2,4 triazole | 0.09 g | R900 ®[a] |
| 11 | C (10.0 g) | 2.0 g | 0.18 g 2,2 Dipyridyl | 0.10 g | none |
| 12 | C (10.0 g) | 2.0 g | 0.18 g 2,2 Dipyridyl | 0.10 g | none |

TABLE 1-continued

Curable Compositions Comprising Amine-Reactive Vinyl Polymers and Trifunctional Amines

| Example | Resin Procedure (wt used) | TFA amine (wt used) | Benzo-triazole | 2-Hydroxy-pyridine | Pigment Type |
|---|---|---|---|---|---|
| 13 | C (10.0 g) | 2.0 g | amine 0.18 g | 0.10 g | none |

*Control
<sup>a</sup>Dupont TiO₂ pigment TIPURE R-900 ®

The compositions of the formulations in Table 1 are coated onto steel panels following the procedure set forth in Example 1. They are cured and then evaluated for corrosion protection in a salt spray, and the results, together with those of Example 1 1, are set forth in Table 2:

TABLE 2

Corrosion Resistance Against Salt Spray, (%)/Hours Exposure

| Example | 24 | 48 | 72 | 96 | 120 | 144 | 168 | 192 | 216 | 240 | 288 | 792 |
|---|---|---|---|---|---|---|---|---|---|---|---|---|
| 1A* | 0.0 | 0.1 | — | — | 1.0 | 1.0 | 1.0 | — | — | — | 3.0 | — |
| 1 | 0.0 | 0.0 | — | — | 0.06 | 0.06 | 0.06 | — | — | — | 0.06 | 0.06 |
| 2A* | 0.06 | 0.6 | — | — | 3.0 | 10.0 | — | — | — | — | — | — |
| 2 | 0.0 | 0.0 | — | — | 0.0 | 0.0 | 0.0 | — | — | — | 0.0 | 0.01 |
| 2B* | 0.0 | 0.0 | 0.0 | — | — | 0.3 | 3.0 | — | — | 16.0 | — | — |
| 3A* | 0.3 | 3.0 | — | — | — | — | — | — | — | — | — | — |
| 3B* | 0.0 | 0.0 | 0.03 | — | — | 33.0 | — | — | — | — | — | — |
| 3 | 0.0 | 0.0 | 0.0 | — | — | 0.03 | 0.06 | — | — | 0.6 | — | — |
| 4A* | 0.6 | 3.0 | — | — | — | — | — | — | — | — | — | — |
| 4B* | 0.0 | 1.0 | 16.0 | — | — | 33.0 | — | — | — | — | — | — |
| 4 | 0.0 | 0.0 | 0.01 | — | — | 0.03 | 0.2 | — | — | 3.0 | — | — |
| 5A* | 0.3 | 1.0 | 3.0 | — | — | — | — | — | — | — | — | — |
| 5 | 0.03 | 0.06 | 0.06 | — | — | — | 0.06 | — | — | 0.1 | — | — |
| 6A* | 3.0 | 3.0 | 10.0 | — | — | — | — | — | — | — | — | — |
| 6 | 0.3 | 0.3 | 1.0 | — | — | — | 16.0 | — | — | — | — | — |
| 7A* | 0.0 | 10.0 | — | 16.0 | — | — | 16.0 | — | — | — | — | — |
| 7 | 0.03 | 0.03 | 0.03 | — | — | — | 3.0 | — | — | 10.0 | — | — |
| 8 | 0.0 | — | 0.0 | 0.0 | 0.03 | — | 3.0 | — | 8.0 | — | — | — |
| 9 | 0.0 | 0.0 | 0.0 | 0.0 | — | — | — | 0.0 | — | 0.0 | — | — |
| 10 | 0.0 | 0.0 | — | — | — | 0.0 | 0.0 | 0.0 | — | — | — | — |
| 11 | 0.0 | — | 0.06 | — | 0.06 | — | — | — | — | — | 0.3 | — |
| 12 | 0.0 | — | 0.06 | — | 0.06 | — | — | — | — | — | 10.0 | — |
| 13 | 0.0 | — | 0.06 | — | 1.0 | — | — | — | — | — | 16.0 | — |

The data in Table 2 demonstrate the effectiveness of including a benzotriazole or a dipyridyl compound, alone, or in further combination with 2-hydroxypyridine to improve the resistance of coatings and metal substrates to corrosion. It is noteworthy that comparative Example 2B* which corresponds to Example 3 of EPO Application 0138025, an excellent protective coating in its own right, has its resistance to salt spray attack vastly improved by adding benzotriazole and 2-hydroxypyridine in accordance with the present invention, Example 2.

The foregoing patents, publications, and test methods are incorporated herein by reference.

Many variations will suggest themselves to those skilled in this art in light of the above, detailed description. For example, instead of benzotriazole, these can be used: 2-benzimidazolemethanol, ethylenediamine, 1,5-pentamethylene tetrazole, tetramethylene pentamine, and the like. Other monomers can comprise dimethylaminopropyl methacrylate, 2-vinyl imidazole, morpholinoethyl acrylate, 4-vinyl pyridine, 1-vinyl imidazole, and the like. All such obvious variations are within the full intended scope of the appended claims.

I claim:

1. A curable composition adapted to provide corrosion resistant coatings, said composition comprising:

(a) a vinyl polymer containing from about 1 to 100 weight percent of repeating units derived from a monomer of the formula:

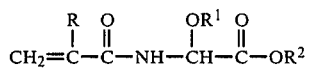

wherein the R group is hydrogen or methyl, R¹ is hydrogen, alkyl of 1-6 carbon atoms, or 2-hydroxyalkyl of 2-6 carbon atoms, and R² is alkyl of 1-6 carbon atoms, cycloalkyl of 5-6 carbon atoms, and 2-hydroxyalkyl of 2-6 carbon atoms, and the balance of repeating units from one or more copolymerizable ethylenically-unsaturated comonomers;

(b) a crosslinking agent containing at least two primary or secondary amine groups per molecule, the crosslinking agent being present in an amount sufficient to form a crosslinked polymer, and an effective corrosion preventing amount of:

(c)(i) a benzotriazole or a dipyridyl, alone, or in further combination with (ii) 2-hydroxypyridine.

2. A composition as defined in claim 1 wherein the vinyl polymer contains from about 10 to 60 weight percent of said monomer containing activated carboxylic ester group.

3. A composition as defined in claim 1 wherein said comonomer is selected from an alkyl acrylate, an alkyl methacrylate, styrene, acrylonitrile, maleic acid, fumaric acid, a functional acrylate or a mixture of any of the foregoing.

4. A composition as defined in claim 1 wherein said monomer is methyl acrylamidoglycolate methyl ether.

5. A composition as defined in claim 1 wherein said monomer is butyl acrylamidoglycolate butyl ether.

6. A composition as defined in claim 1 wherein amine-reactive vinyl polymer (a) comprises an acrylic polymer having an acrylic amine incorporated into the polymer backbone.

7. A composition as defined in claim 6 wherein said acrylic amine comprises t-butylaminoethyl methacrylate.

8. A composition as defined in claim 6 wherein said acrylic amine comprises dimethylaminopropyl methacrylamide.

9. A composition as defined in claim 1 wherein component (b) comprises an amine-containing compound selected from the following: 1,2-ethylenediamine, 1,3-propylenediamine, 1,2-butylenediamine, 1,4-butylenediamine, 1,6-hexamethylenediamine, 1,7-heptanediamine, diethylenetriamine, xylyldiamine, 4,7-dioxadecan-1,10-diamine, 1,2-diaminocyclohexane, bis(p-aminocyclohexyl)-methane, 2,2-bis (4-aminocyclohexyl)propane, N,N-bis-(3-aminopropyl)methylamine, bis(hexamethylenetriamine) and a polymer containing at least about 1% weight pendant amine groups, a compound of the formula

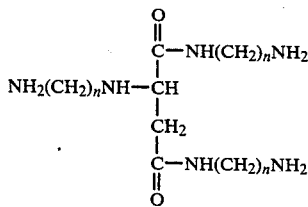

in which n=4–8, or a mixture of the foregoing.

10. A composition as defined in claim 9 wherein component((b) comprises a compound of the formula

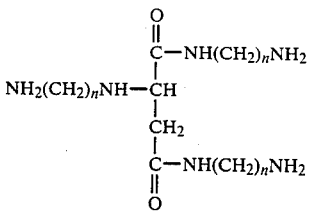

in which n=4–8.

11. A composition as defined in claim 10 wherein, in crosslinking component (b), n is equal to 6.

12. A composition as defined in claim 1 wherein component (b) comprises from about 0.8 part to about 1.2 equivalents of primary amine per equivalent of activated part per 100 parts by weight of activated ester in polymer component (a).

13. A composition as defined in claim 1 wherein component (c) comprises from about 1 part to about 5 parts by weight based on 100 parts by weight of polymer component (a).

14. A composition as defined in claim 6 wherein said acrylic amine comprises from about 1.5 parts to about 12 parts by weight of said amine-reactive vinyl polymer (a).

15. A crosslinked corrosion resistant coating obtained by curing a composition as defined in claim 1.

16. A crosslinked corrosion resistant coating obtained by curing a composition as defined in claim 6.

17. A crosslinked corrosion resistant coating obtained by curing a composition as defined in claim 9.

18. An article of manufacture comprising a metallic substrate normally adversely affected by corrosive environments and on said substrate a crosslinked corrosion resistant coating layer obtained by curing a composition as defined in claim 1.

19. An article of manufacture comprising a metallic substrate normally adversely affected by corrosive environments and on said substrate a crosslinked corrosion resistant coating layer obtained by curing a composition as defined in claim 6.

20. An article of manufacture comprising a metallic substrate normally adversely affected by corrosive environments and on said substrate a crosslinked corrosion resistant coating layer obtained by curing a composition as defined in claim 9.

* * * * *